May 26, 1959 E. WEISS 2,888,200

CIRCUITRY FOR PERFORMING SQUARE ROOT

Filed July 1, 1953 7 Sheets-Sheet 1

INVENTOR:
Eric Weiss

By Mason, Mason & Sheridan
Patent Attorneys

May 26, 1959 E. WEISS 2,888,200

CIRCUITRY FOR PERFORMING SQUARE ROOT

Filed July 1, 1953 7 Sheets-Sheet 2

INVENTOR:
Eric Weiss

By Mason, Mason & Sheridan
Patent Attorneys

INVENTOR:
Eric Weiss
By Mason, Mason & Sheridan
Patent Attorneys

May 26, 1959 E. WEISS 2,888,200

CIRCUITRY FOR PERFORMING SQUARE ROOT

Filed July 1, 1953 7 Sheets-Sheet 4

INVENTOR:
Eric Weiss

By Mason, Mason & Sheridan
Patent Attorneys

INVENTOR:
Eric Weiss
By Mason, Mason & Sheridan
Patent Attorneys

CIRCUITRY FOR PERFORMING SQUARE ROOT

Filed July 1, 1953 7 Sheets-Sheet 6

INVENTOR:
Eric Weiss

By Mason, Mason & Sheridan
Patent Attorneys

INVENTOR:
Eric Weiss
By Mason, Mason & Sheridan
Patent Attorneys

United States Patent Office 2,888,200

Patented May 26, 1959

2,888,200

CIRCUITRY FOR PERFORMING SQUARE ROOT

Eric Weiss, Los Angeles, Calif., assignor, by mesne assignments, to National Cash Register Company, a corporation of Maryland Application July 1, 1953, Serial No. 365,465

9 Claims. (Cl. 235—158)

This invention relates to electronic digital computing machines and more particularly to novel circuitry for generating the square root of a binary number.

It has been customary in the past to automatically obtain the square root of a number by especially coding or programming a general purpose type computer to perform this function. In certain applications, however, it is highly desirable to have a built-in instruction in the machine for extracting the square root. Using this approach, the number whose square root is desired need be merely inserted into the computer. Then, at a given signal, generated either by the computer or manually by the operator, the circuitry for performing this instruction is initiated to automatically derive the square root of the number. This obviously simplifies the process since the operator need not initially program the computer to carry out the routine.

It is therefore one of the objects of this invention to provide novel built-in circuitry for automatically performing the square root operation.

Another object of this invention is the provision of a novel means and method of extracting the square root of a binary number.

Still another object of this invention is to provide a fast-acting, simple, cyclical step process for the generation of the square root of a binary number.

Briefly the square root routine employed in the present invention is an adaptation of the well-known manual method of extracting the square root by the orderly subtracting of successive odd numbers from the number whose square root is desired in order to determine the digits of the root. This is performed on a desk calculator, for example, by successively depressing the keys 1, 3, 5, 7, etc. of the keyboard. This process is reformulated in the present invention for the binary number system and consists primarily of constantly altering and shifting the contents in a first register in which the square root is being set up, and adding or not adding the contents of this register into a second register, which contains the one's complement of the number whose square root is being generated. The present embodiment employs the use of a parallel operated accumulator. The decision as to whether the addition should take place is made by observing the output state of the last stage of a logical carry network which takes its configuration irrespective of whether or not the addition is to be performed. If such a carry-out is not noted, the addition is performed, whereas if a carry-out is noted, the addition is inhibited from taking place. As a result of a repetition of these functions, the square root is obtained in the first register analogous to the method in which twice the value of the square root is formed on the keyboard of a desk calculator. A third register is provided during this routine which serves to identify where digits are to be inserted in the first register during each cycle of the computation.

This invention will be made more apparent by the following description and claims and illustrated in the accompanying drawings which disclose, by way of example, the principle of the invention and the best mode which has been contemplated of applying that principle.

In the drawings:

Fig. 1 explains by way of examples the process by which the circuit of the present embodiment generates the square root of a binary number.

Figures 1, 2:
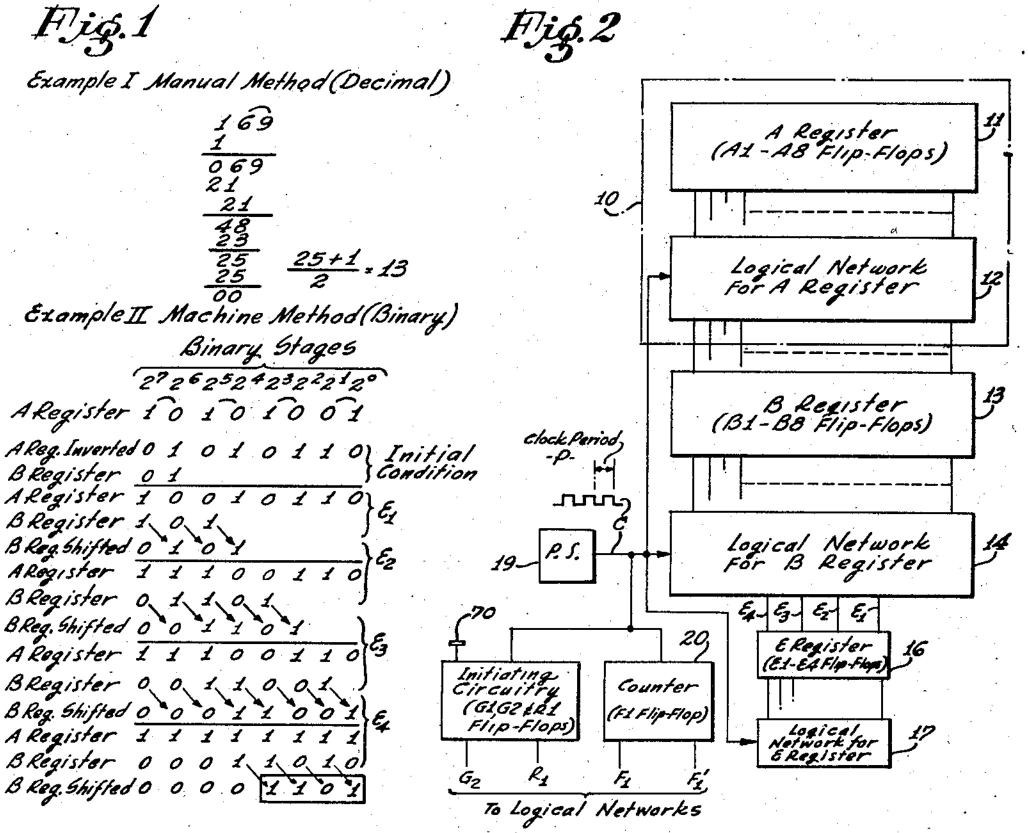
Fig. 2 is a simplified block diagram of the circuit of the present invention.

Referring to Fig. 1, the process for extracting the square root of a decimal number by subtracting successive odd numbers, as is well known in the prior art, is illustrated by Example I. To obtain the square root of number 169, for instance, the first step is to subtract the number 1 from the most significant digit of the number 169. The next odd number, 3, cannot be subtracted from the remainder and hence the next even number, 2, instead is recorded and a digit 1 inserted in the next lower order position. This number 21 is then shifted one digital position to the right and subtracted from the remainder. The next odd number, 23, is then subtracted; and finally, the next odd number, 25, is subtracted, resulting in a remainder of zero. When utilizing a desk calculator for performing this process, the number 25 is found on the keyboard. As noted, adding a one to this last odd number 25, and then dividing by two, results in the answer 13.

The binary process utilized in the present invention for obtaining the square root is an adaptation of the method above described. This is illustrated by Example II, which shows how the binary equivalent of decimal 169 is operated upon to derive its square root.

The register containing the square root being generated is indicated as the B register, and the register containing the number to be operated upon is indicated as the A register. It should be appreciated that the use of binary numbers simplifies the present square root routine to a case of either subtracting or not subtracting an odd number in the B register from the contents of the A register, followed by an alteration, and shifting of the odd number in the B register.

In the present embodiment, the computer performs subtraction by adding the odd numbers to the one's complement of the number. Thus, as far as the machine is concerned, the first step of the machine process is to obtain the 1's complement of the number in the A register and to set up the first odd number 01 in the B register. The next step of the process is to add this first odd binary number 01 to the complemented number in the A register if the addition can be performed without generating a carry-out from the most significant stage, $2^7$, of the A register. In this first instance, since this addition can be performed, a unit is added to the first odd number 01 in the B register, resulting in $01+1=10$. A digit 1 is then inserted to the right, i.e., the next lower order of this number, resulting in 101. This number in the B register is then shifted one digital position to the right and an inspection is made to determine if it can be added to the now existing contents of the A register without generating a carry-out from the most significant stage of the A register. Since, for this case, no carry-out is again noted, the addition is performed; a digit 1 is added to the number content of the B register thus far obtained; and a 1 is inserted in the next lower order position, thus obtaining 1101. This number is then shifted one digital position to the right, and an inspection is again made to determine whether a carry-out will be generated by adding the contents of the B register to the contents in the A register. In this instance a carry-out will be generated, and so the addition is inhibited from taking place. For this condition, a 1 must be subtracted from the number in the B register and a 1 inserted in the next lower position. This results in obtaining the binary number 11001 which is shifted one binary position to the right. An inspection is again made to determine if a carry-out will result from the addition. It should be noted in this instance that the addition can take place with the result that the A register is filled with 1's, thus indicative that the remainder is actually zero. The number content of the B register at this time corresponds to the number left on the keyboard when using the desk calculator process for extracting roots. In this instance, since the previous addition could be carried out, a 1 is added to the contents of the B register and this number is then shifted one digital position to the right. As previously noted in Example 1, the number 25 on the keyboard has a 1 added to it and was then divided by 2 in order to obtain the square root. That is exactly the process to be performed on the binary number in the B register during the last cycle. As a result, the contents 1101 found in the first four flip-flops of the B register represents the number corresponding to the square root desired.

It should be appreciated from the example above described that the cyclical process for generating the square root may be reduced to the following mechanized pattern.

Initially, the number whose square root is to be extracted is complemented in the A register. Simultaneously, the binary digits 0 and 1 are introduced into the two most significant digit positions $2^7$ and $2^6$, respectively, of the B register. As noted in Example II (Fig. 1), these conditions are there designated as initial conditions.

The first cycle of the computation is designated by the term $E_1$. This includes inspecting to determine if a carry-out would be generated from the A register as the result of adding the contents of the B register into the A register. If a carry-out is not generated, the addition is performed. Simultaneously a 1 is inserted in the most significant stage, $2^7$, of the B register and the digits 0, 1 inserted in the next two lower order stages $2^6$ and $2^5$, respectively. If a carry-out from the A register would result from the addition, the addition is not carried out, and a 0 is inserted in the most significant stage $2^7$ of the B register, and the digits 0, 1 inserted in the next two lower order positions, $2^6$ and $2^5$, respectively.

The next cycle of the computation, designated by the term $E_2$, includes shifting the contents of the B register one digital position to the right, i.e., toward the least significant digit. Inspection is then made to determine whether a carry-out will be generated as a result of adding the now existing contents of the B register into the A register. If a carry-out is not generated, the addition is performed. Furthermore, if the carry-out is not generated, a digit 1 is inserted in the $2^5$ position of the B register; otherwise a digit 0 is inserted therein. The digits 0 and 1 are inserted in either case in the next two lower order positions $2^4$, $2^3$ of the B register.

It can be seen that the following cycles of the computation, designated $E_3$ and $E_4$, consist of a similar shifting of the B register and an insertion of digits in certain predetermined digital positions.

The cyclical routine for generating each digit of the root thus broadly comprises the steps of shifting the contents of the B register one digital position to the right; adding or not adding the contents of the B register into the A register depending on whether a carry-out or no carry-out is obtained from the A register; inserting the digit 0 or 1 in predetermined even stages of the B register depending on whether a carry-out or no carry-out is obtained from the A register; and simultaneously inserting the digits 0 and 1 into the two following lower order stages, respectively, of the B register.

A simplified block diagram of the circuitry provided for performing the square root operation, as above described, is shown in Fig. 2. The binary accumulator 10 includes A register 11 and a logical network 12. The A register 11 is comprised of a series of flip-flop circuits A1 to A8, inclusive, corresponding to binary stages $2^0$ to $2^7$, respectively. Logical network 12 serves two functions; first it sets up the interstage carry signals irrespective of whether the addition is to be performed or not; and secondly it determines the required changes to be made in the flip-flops A1 to A8 in order to perform the function of adding to its content the binary content found in B register 13 comprised of a similar group of flip-flops B1 to B8, inclusive. The contents of the B register 13 is controlled in turn by a logical network 14 which functions to set up therein the number to be added to the A register 11. This involves both inserting digits and shifting digits. An E register 16 which is being controlled by a logical network 17 functions to orderly select the circuits of the logical network 14 which are to be effective to insert digits into predetermined positions of the B register 13 during the course of the computation.

A clock pulse source 19 continuously emits square waves C having a clock period P. The clock period P is defined as the interval between the trailing edge of one clock pulse and the trailing edge of the succeeding clock pulse. These clock periods determine the time allocated to a binary digit which is manifested, for example, by the potential output from a flip-flop circuit. As will be noted in the ensuing description, all the circuit operations are synchronized with the clock periods in that all changes of the flip-flop circuits occur at the end of the clock period.

In the present invention, each cycle of the computation requires two steps or clock periods. The active step of the cycle during any clock period is indicated by the effective state of a flip-flop F1 functioning as a scale-of-two counter 20.

Figure 3:
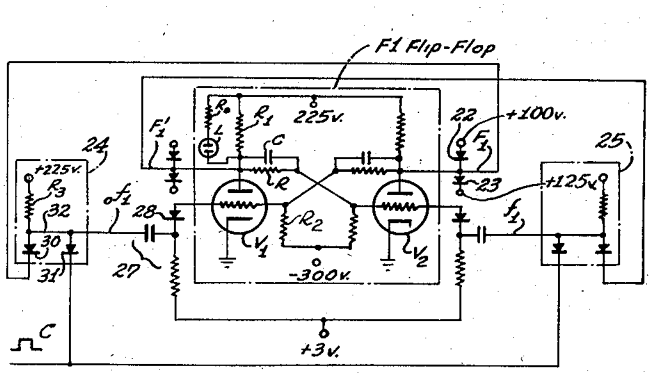
Fig. 3 is a detailed circuit diagram of the F1 flip-flop circuit.

The mode of operation of the flip-flop circuits of the present invention will be made clear by a detailed description of how the F1 flip-flop circuit shown in Fig. 3 is connected so as to operate as a scale-of-two counter.

The flip-flop circuit as used in the present invention is well known in that it is comprised of two triodes, $V_1$ and $V_2$, each of which has its plate intercoupled to the grid of the other by a resistor R in parallel with a capacitor C. The plate of each of the triodes is connected through a load resistor, like resistor $R_1$, to a positive D.C. source +225 v., and the cathode of each triode is grounded. Each of the grids of the tubes is connected through a resistor, like grid resistor $R_2$, to a negative bias −300 v. The flip-flop circuit is further provided with triggering circuits connected to each of its grids and output circuits connected to each of its plates.

Whenever, the F1 flip-flop circuit is considered to be in a "one" state, a neon light L, connected in series with a limiting resistor $R_0$ across the left load resistor $R_1$, lights up; and when the flip-flop circuit is in a "zero" state, neon light L is out.

The output lines $F_1$ and $F'_1$ from the F1 flip-flop circuit are taken from the right and left plates, respectively. In order to maintain the swing of the plate voltage between voltage levels 125 v. and 100 v., clamping diodes, such as diodes 22 and 23 associated with the right output $F_1$, are provided on each output line.

The inputs to the flip-flop circuit are controlled by diode gate circuits 24 and 25 associated with the grids of the $V_1$ and $V_2$ tubes, respectively. Each of the gates is coupled to a grid through a differentiating circuit 27 and a blocking diode 28 as shown in particular for the left grid, the grid of tube $V_1$.

In order to operate as a scale-of-two counter, the right plate output $F_1$ is connected to one input of the left gate 24, and the left plate output $F'_1$ is connected to one input of the right gate circuit 25. The clock pulse C is applied simultaneously to the second input of the left and right gate circuits 24 and 25.

As will be noted hereinafter, these gate circuits 24 and 25 are typical logical "and" diode networks. In such a circuit, as noted in particular for left gate 24, the inputs therein are applied on the cathode-ends of crystal diodes 30 and 31 whose anode-ends are joined to a common line 32 which is connected to positive source +225 v. through a load resistor $R_3$. Any time the input to the gate circuit, received from the opposite side of the flip-flop circuit 24, is high in potential, the clock pulse C applied to the other input of the gate is, in effect, passed to the gate output. As noted at the output of gate 24, this pulse is differentiated in differentiating circuit 27 and the positive portion thereof is blocked by diode 28 while the negative portion is passed therethrough and thus triggers the $V_1$ tube off.

Figure 4:
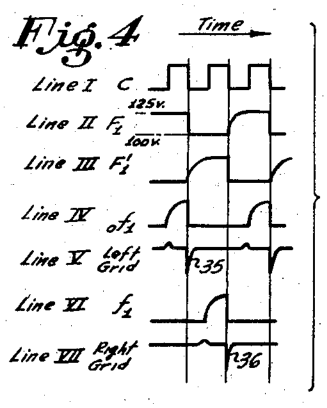
Fig. 4 is a graph of the voltage waveforms which are referred to in explaining the operation of the F1 flip-flop.

Fig. 4 shows a graph of the waveforms appearing at different points of the F1 flip-flop circuit. In line I the regularly recurring clock pulses C are shown; in line II the $F_1$ plate output is shown to be initially of a high voltage 125 v.; while in line III the $F'_1$ plate output is shown to be initially of a low voltage 100 v. As shown in line IV, whenever both the waveforms $F_1$ and C are relatively high in potential, the term $_0f_1$ is considered to pass through the gating circuit 24 as a rectangular pulse similar in waveform to the clock pulse C. On line V, the pulse form impressed on the input to the left grid is shown to be essentially the differentiated trailing edge 35 of the rectangular pulse $_0f_1$. It is thus noted that the F1 flip-flop changes state on the trailing edge of the $_0f_1$ pulse (clock pulse C). It is also noted that, as a result of the triggering of the left tube $V_1$ off, the left plate output $F'_1$ rises in potential according to the time constant of the RC interconnecting network of the flip-flop circuit. The output $F'_1$ is now high in potential so that on occurrence of the next clock pulse C the right gate 25, in effect, allows the clock pulse C to pass therethrough, and hence the differentiated trailing edge 36 of this latter pulse triggers the F1 flip-flop back to its original state.

It is now evident that the clock pulse period divides the timing of the circuit operations into two distinct phases. During the first phase of a clock pulse period, when the voltage from the clock source is low, the transients of the circuitry are occurring. For reliability, these should be completed before the leading edge of the clock pulse arrives. For the duration of the clock pulse, i.e., the second phase of the clock pulse period, the logical networks can be thought of as observing the flip-flop circuits so as to know if a pulse should pass onto the grid of any of the flip-flop circuits. The clock pulse must be broad enough so that, taking into account its rise time, it reaches its maximum voltage level before the end of the clock period. The clock pulse must also be generated from a low impedance source so that a square edge can be created on the trailing edge of the pulse passing through the grid gates. These conditions make it possible to create by differentiation a negative pulse, coincident with the end of the clock period, which can be used for triggering the flip-flop circuits.

Before going into a description of the details of the remaining circuits of the invention, it will be pointed out how the arrangement of the inputs and outputs of the flip-flop circuits of the present invention enables the detailed logical circuitry for performing the present process to be defined by logical equations. A logical equation, as herein used, defines the validity of a proposition flip-flop in terms of the validity of other propositions. The true and false conditions of a proposition flip-flop are preferably referred to as terms which are represented throughout the circuits by a D.C. voltage at a point. This voltage can exist at either of two D.C. levels. When a term is effective, the voltage is high, 125 v.; and when the term is ineffective, the voltage is low, 100 v. (see Fig. 4).

Thus, as shown in Fig. 3, by connecting output lines, for example, to each of the plates of the tubes of a flip-flop circuit, the output line having a high potential determines the effective term of the proposition represented by the flip-flop circuit. The other output line, having necessarily a low potential, then represents the ineffective term. Furthermore, by providing an input line to the grid of each of the tubes of the flip-flop circuit, it is possible to independently control the states of the flip-flop circuits.

The inputs and outputs of the flip-flop circuits of the present invention are defined in a systematic manner by useing the following standard nomenclature: Each of the proposition flips-flops is designated by combinations of capital letters and numbers, and the outputs of the flip-flops are characterized by corresponding capital letters with an appropriate subscript. In order to characterize the true state output of a flip-flop from the false, the latter is distinguished from the former by an affixed prime. On the other hand, the inputs to a flip-flop circuit which trigger it into a true or false state are designated by corresponding lower case letters with an appropriate subscript. The input for rendering the flip-flop false is further characterized by a subscript zero prefixing the lower case letter.

Figure 5:
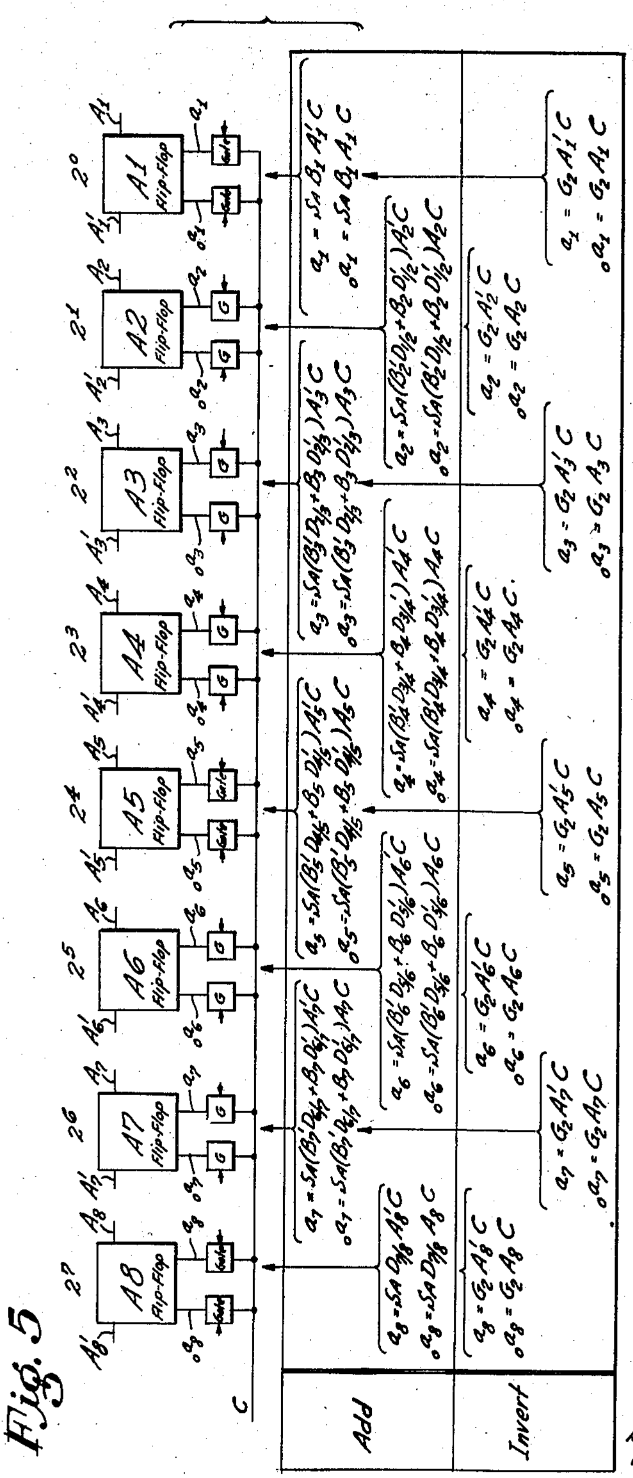
Fig. 5 shows the flip-flop circuits of the A register together with the logical trigger equations for their grids.
Figure 6:
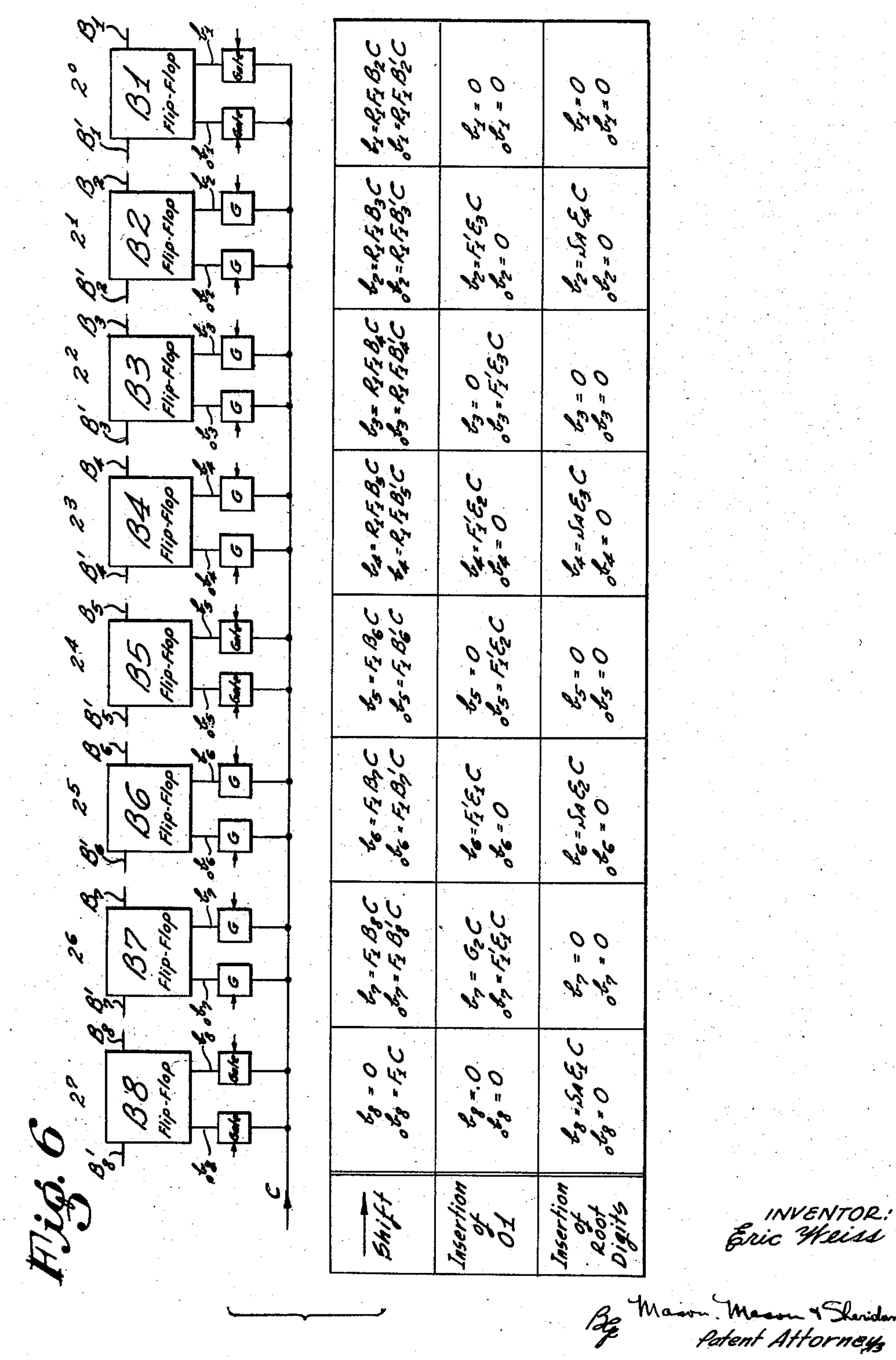
Fig. 6 shows the flip-flop circuits of the B register together with the logical trigger equations for their grids.

Referring next to Figs. 5 and 6, the simplified manner in which the remaining circuitry of the present invention is to be presented will now be described. Instead of showing the wiring diagrams of the flip-flops together with the logical circuits, as in Fig. 3, the remaining drawings present simplified block diagrams of the flip-flop circuits. It should be understood, however, that all the flip-flop circuits are identical. Thus in Fig. 5 only the input and output lines for the flip-flop circuit are indicated and these are marked in accordance with the convention previously described. Furthermore, the grid input differentiating and blocking circuits are omitted in the block diagrams for simplicity. Only the gates, responsive to a control input and a clock pulse, are shown at each of the flip-flop inputs so as to emphasize the fact that the clock pulses are applied simultaneously to all the flip-flop circuit inputs.

Presented below the block diagram of the respective flip-flop circuits are the logical equations which define when and how the flip-flop circuits are to change at the end of each clock period in accordance with the effective terms of the system so as to perform the function desired.

The logical equations for the grid triggering of a flip-flop circuit consist of stating the terms which have to be simultaneously of a high potential in order that the flip-flop circuit should trigger into a particular state. Two operators are used in the equations. The first, "logical multiplication," means that all the terms in the particular product have to be of high potential in order to make that product effective in a particular equation. The second, "logical addition," means that at least one term of the sum has to be of high potential in order to make that sum effective in a particular equation.

Thus, for example, the equation $$_0a_2 = S_A(B'_2D_{1/2} + B_2D'_{1/2})A_2C$$

means that the A2 flip-flop will change to the "false" state at the end of the clock period C during which the following three terms are at a high potential: $S_A$, $(B'_2D_{1/2}+B_2D'_{1/2})$, and $A_2$, where $(B'_2D_{1/2}+B_2D'_{1/2})$ itself will be of a high potential whenever both terms $B'_2$ and $D_{1/2}$, or both terms $B_2$ and $D'_{1/2}$ are simultaneously of a high potential.

Figure 7:
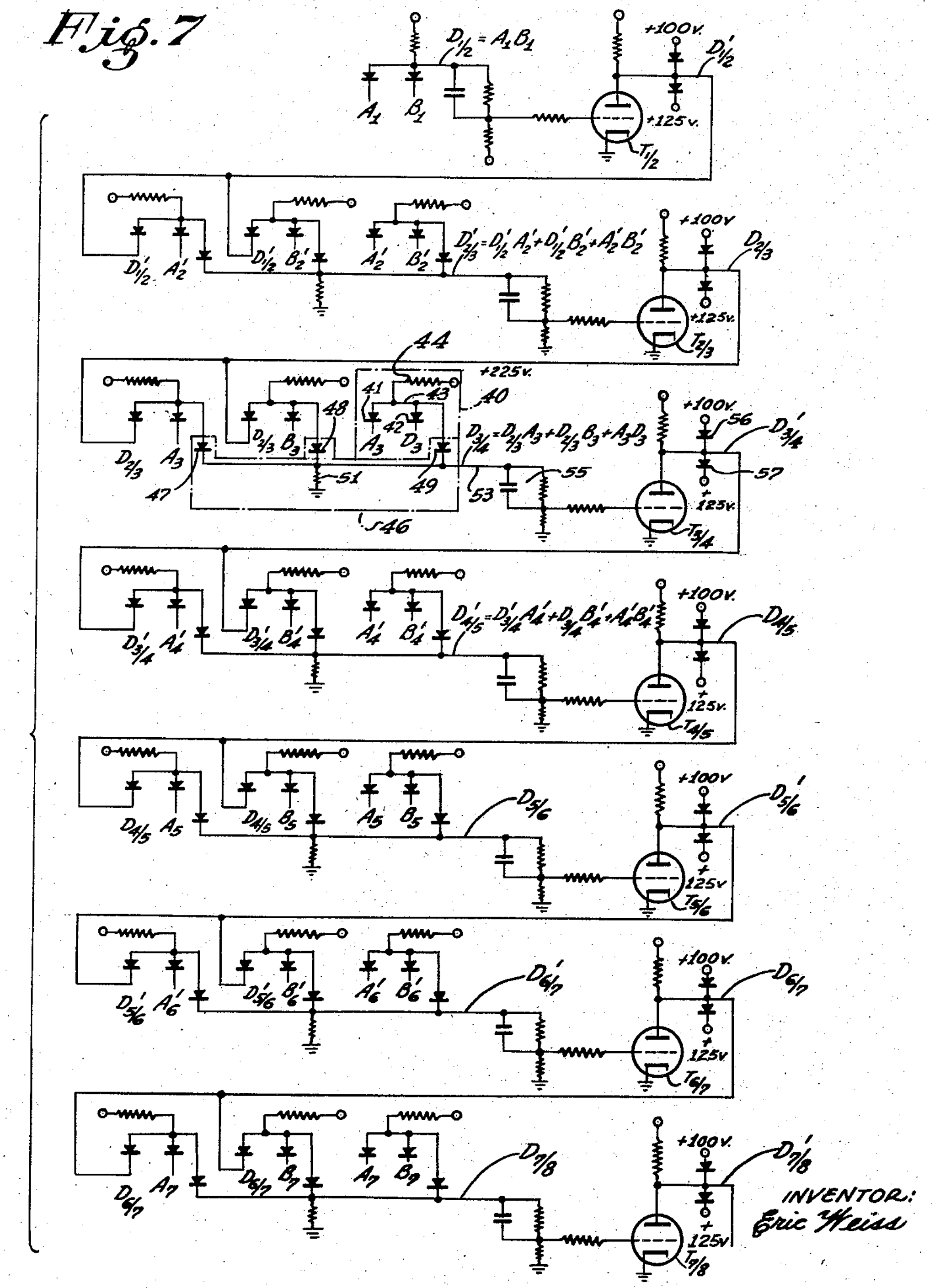
Fig. 7 shows the network for generating the inter-stage carry information for the A register flip-flop circuits.
Figure 8:
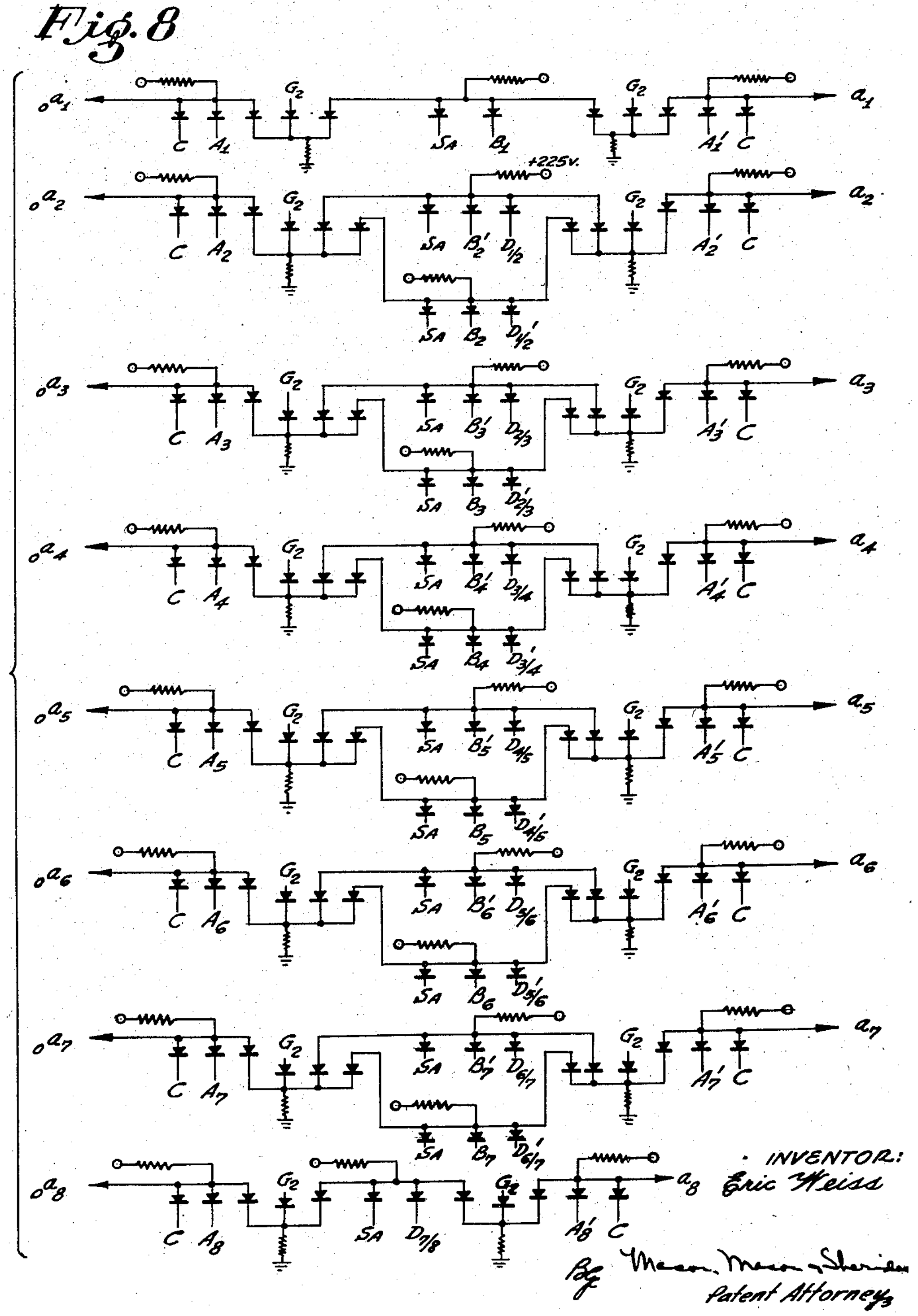
Fig. 8 shows the networks for generating the logical trigger equations for the A register flip-flop circuits.
Figure 9:
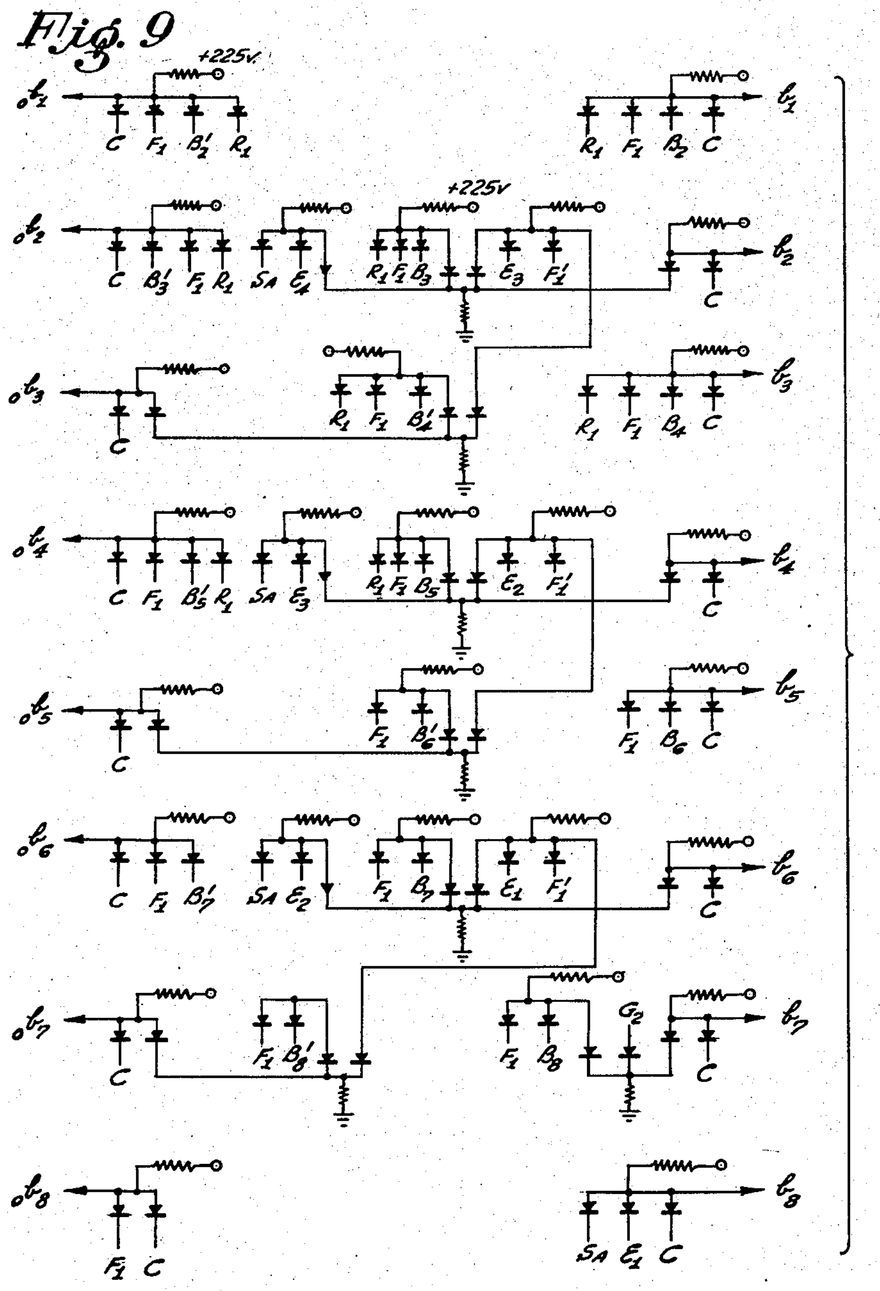
Fig. 9 shows the networks for generating the logical trigger equations for the B register flip-flop circuits.

A detailed description of the accumulator 10 will next be presented. During any clock period, the A register 11 is assumed to be storing a binary number and the associated logical network 12 functions to add the contents of the B register 13 to the contents of the A register 11 in a parallel fashion, i.e., all stages simultaneously. The logical network 12 is designed to have a fast response to the signals indicative of the states of the flip-flops of the A register 11 and the flip-flops of the B register 13. By the use of these signals, the logical network 12 generates control potentials for effectively gating clock pulses into the inputs of the A flip-flop circuits. The logical network 12 is comprised of carry networks, as shown in Fig. 7, and trigger networks, as shown in Fig. 8. Stated generally, the carry networks are capable, in response to the information residing in the flip-flop circuits, to determine the interstage carry information before the addition is performed. The trigger networks respond to the information in the flip-flop circuits, and also respond to the carry information generated by the carry networks. In addition, the trigger networks respond to clock pulses. As a result, whenever conditions are such that a trigger network, connected to the input of a particular flip-flop circuit, is effective, a clock pulse is impressed on this input. The input circuitry then operates to differentiate the fall of the clock pulse to generate a negative pulse which triggers the flip-flop circuit to the state called for.

Referring next to Fig. 7, the detail of the carry network for generating the interstage carry information for the accumulator is shown. The present embodiment provides for generating by means of diode networks the "carry" information from the odd to even stages, and the "no carry" information from the even to odd stages in accordance with the teachings of a co-pending application of Weiss et al., Serial No. 364,442, filed June 26, 1953. Thus note that output lines $D_{1/2}$, $D_{3/4}$, etc., which provide signals corresponding to "carry" information from the odd stage to the even stage indicated by their subscripts, are each defined by a logical equation which is generated by the diode network shown. Signals corresponding to "no carry" information for these stages are then obtained on output lines $D'_{1/2}$, $D'_{3/4}$, etc. by inverting the signals on outputs $D_{1/2}$, $D_{3/4}$, etc. by means of triode tubes $T_{1/2}$, $T_{3/4}$, etc., respectively.

On the other hand, the "no carry" signal from the even to odd stages are defined by logical equations and generated on output lines $D'_{2/3}$, $D_{4/5}$, etc. by diode networks, while signals corresponding to the "carry" information for these stages are derived on output lines $D_{2/3}$, $D_{4/5}$, etc. by inversion of these "no carry" signals in tubes $T_{2/3}$, $T_{4/5}$, etc., respectively.

It should be appreciated that each logical equation defines under what condition the "carry" or "no carry" information for a stage will be generated. Thus, logical equation $D_{3/4}=D_{2/3}A_3+D_{2/3}B_3+A_3B_3$, for example, defines the "carry" from the third to fourth stage of the accumulator. From this, it should be obvious that whenever any two of the three digits into a stage are 1's, the "carry" will be generated. Similarly, equation $$D'_{2/3}=D'_{1/2}A'_2+D'_{1/2}B'_2+A'_2B'_2$$

which represents the logical equation defining the "no carry" from the second to third stage of the accumulator, is no more than a statement that, whenever any two of the three input digits into a stage are 0's, a "no carry" will be generated.

As noted in Fig. 7, the portion of the diode network enclosed within block 40 is a typical logical "and" or product network. In such a circuit, signals having voltage levels of either +100 or +125 are obtained from the source indicated and applied on the cathode-ends of crystal diodes, such as 41 and 42, whose anode-ends are joined to a common line 43 which is connected to a positive source +225 v. through a product resistor 44. Any time all the diode input signals to product circuit 40 are at the high potential of +125 v., the output line 43 swings to this high potential. If any one of the input signals is at the low potential of +100 v., the output line 43 is at this low potential because of the current flow through resistor 44. The output line 43 is connected to one of the inputs of a typical logical "or" or sum network enclosed within block 46. This logical sum network is comprised of three input diodes 47, 48, and 49 whose cathode-ends are joined and returned to ground through a sum resistor 51. The input signals to the sum network are applied on the anode-ends of the diodes. Whenever any one of the inputs to logical sum network 46 is at the high potential of +125 v., the current flow through sum resistor 51 causes the output line 53 to swing to the high potential +125 v. indicative of a "carry" into the fourth stage. This logical sum output 53 is connected to driver tube $T_{3/4}$ by way of an integrating circuit 55 which serves to square the waveform impressed onto the grid of driver tube $T_{3/4}$. The plate output of tube $T_{3/4}$ is clamped between +100 v. and +125 v. by diodes 56 and 57 so as to maintain the swing of the $D'_{3/4}$ signal between these limits. This $D'_{3/4}$ output signal is then fed directly into the carry diode network provided for the next stage.

It should be appreciated that this arrangement of the carry diode networks results in a fast propagation of all the interstage carries since the carry information needed for each carry network is obtained directly from the carry driver tube output of the previous stage. This ensures that the carry diode networks for all the stages settle fast enough, in response to their inputs, so that the outputs therefrom can be fed into the trigger input networks causing them, in turn, to settle such that their outputs can rise in time to gate clock pulses to the inputs of the A flip-flop circuits which must be triggered to set up the binary sum.

It should be further understood that because of inherent capacitance in diode networks of this type, the leading edges of the output signals therefrom rise with an appreciable time constant. The driver tubes which interconnect the stage carry networks enable their output signals to be generated in response to less than the swing of the diode network output, thus speeding up the propagation of the carry information which necessarily occurs in succession from the first to last stages of the accumulator.

Referring next to Fig. 8, the trigger circuits for controlling the flip-flop circuits of the A register of the accumulator will next be described. As shown in Fig. 5, these trigger circuits are defined by the logical equations shown below each of the A flip-flop circuits.

Except for the first stage trigger circuits, which do not respond to any carry information, the triggers for each of the remaining stages respond to carry information generated by the carry logical circuitry from the previous stages. For example, the inputs to the diodes in the logical circuitry for generating $a_2$ and $_0a_2$ include $D_{1/2}$ and $D'_{1/2}$. Likewise the inputs to the diodes in the $a_3$ and $_0a_3$ circuitry include $D_{2/3}$ and $D'_{2/3}$. Thus it is noted that these latter terms $D_{2/3}$ and $D'_{2/3}$ are not derived from a flip-flop circuit but rather are generated almost instantaneously during the current clock period, as a function of the first stage carry information, $D_{1/2}$, which latter information was also generated during the current clock period. Thus the need for providing circuitry which will derive the interstage carry information quickly should be clearly understood.

The trigger equations for the A flip-flop circuits define the conditions under which the flip-flops must change state in order to indicate the sum. For example, equation $a_2=S_A(B'_2D_{1/2}+B_2D'_{1/2})A'_2C$ states that when the "add" proposition $S_A$ is true (see Fig. 12), if the A2 flip-flop is in a false state, and either the B2 flip-flop or the "carry" input $D_{1/2}$ is true, but not both, then the A2 flip-flop is triggered into a true state at the trailing edge of clock pulse C. The remaining triggering equations can be similarly explained. As noted below the flip-flop circuits in Fig. 5, logical equations are also provided for inverting the contents of the A register. Thus equations $a_2=G_2A'_2C$ and ${}_0a_2=G_2A_2C$ state that whenever output $G_2$ is true (Fig. 13), the A2 flip-flop is triggered into its opposite state at the trailing edge of the clock pulse C. As noted in the logical networks of Fig. 8, the generation of the "invert" trigger equations are merged in with the "add" trigger equations for the A flip-flop circuits.

Reference will be made next to the flip-flop circuits for the B register, together with the logical equations defining its operations. As previously discussed, the mechanized pattern by which the present circuit computes the square root is reduced to a routine comprised of two steps, i.e., two clock periods. During the first step of the cycle, the contents of the B register is shifted one digital position to the right; and during the second step, if a carry-out from the A register is not generated by the carry logical network, the sum of the contents of the B register and the A register is set up in the A register, and simultaneously, digits are set up in predetermined positions of the B register.

As noted by the equation below the B register flip-flops, the $F_1$ output of the F counter defines the step during which the logical equations are effective to cause the digits of the B register to be shifted one digital position to the right, that is, toward its least significant end. On the other hand, the high potential state of the $F'_1$ output of the F1 flip-flop counter defines the step during which the logical equations are effective to insert digits into predetermined positions of the B register.

Figure 10:
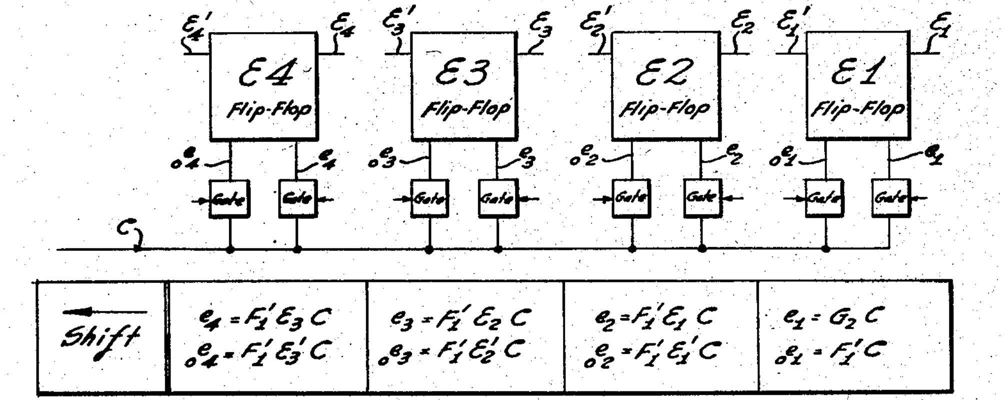
Fig. 10 shows the flip-flop circuits of the E register together with the logical trigger equations for their grids.
Figure 11:
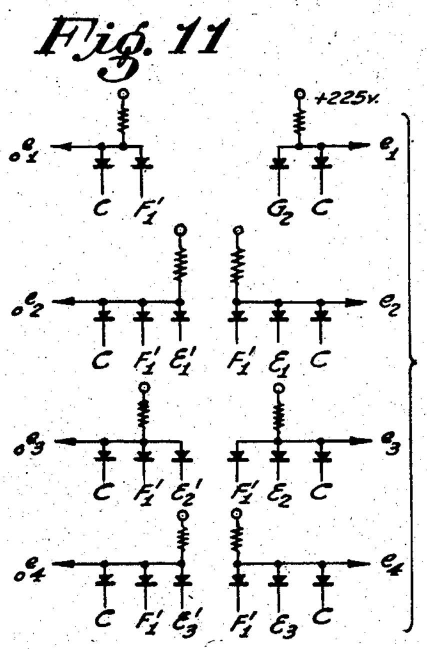
Fig. 11 shows the networks for generating the logical equations for the E register flip-flop circuits.

In order to define where the digits are to be inserted in the B register, use is made of the outputs of the E register as noted by the introduction of the E register output terms in the "insert" logical equations shown below the B flip-flops in Fig. 6. Referring momentarily to Fig. 10, which shows the E register flip-flops, the first flip-flop E1 is initially triggered into a "true" or "one" state at the "go" signal $G_2$, while all the other E flip-flops are initially in a "false" or "zero" state. During each of the cycles of the routine, when the $F'_1$ output of the F1 flip-flop counter is high in potential, the logical equations of the E register flip-flops E2, E3, and E4 are successively made effective, resulting in a shifting of the "one" state to the next higher order flip-flop. In this way the outputs $E_1$, $E_2$, $E_3$, and $E_4$ are energized in order to represent the cycle count of a particular computation. It should be obvious that instead of using a stepping register to indicate the cycle count, a four place counter circuit could be provided to serve this same function.

The explanation of the logical equations for the B register flip-flop will be made clear by a description of how the present circuit operates to generate the square root of the binary equivalent of 169, as described in Example II of Fig. 1. Reference will also be made of the time chart in Fig. 14. First, it is to be noted that initially the A register is assumed to be storing the number whose square root is to be generated, in this case the binary equivalent of 169. The B register and E register are assumed to be initially cleared.

Figure 13:
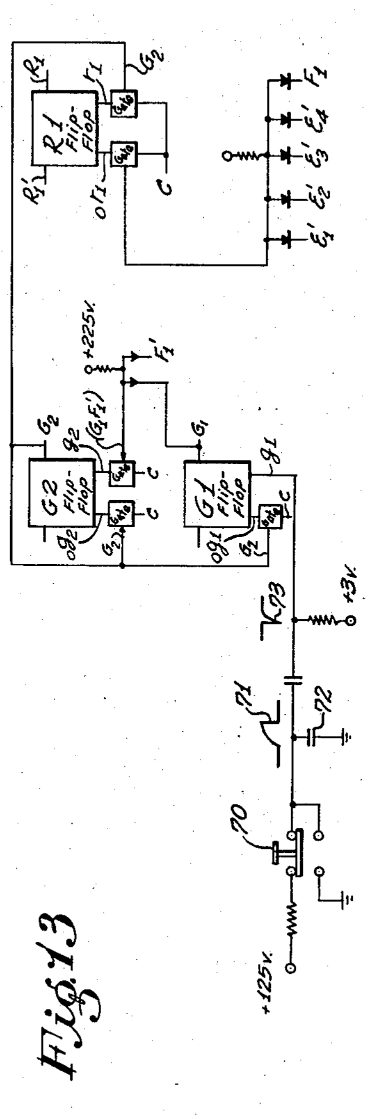
Fig. 13 shows a schematic diagram of the initiating button together with associated flip-flop circuits.

The operator then initiates the circuit by depressing the start button 70, shown in Fig. 13, to set the go flip-flop G1 into a true state. Initially the G1 and G2 flip-flops, as well as the R1 flip-flop, are in a false state. The abrupt trailing edge of the initiating pulse 71, caused by the discharging of condenser 72 to ground, is differentiated to create the negative pulse 73 which triggers the G1 flip-flop into a true state. The coincidence of the next clock pulse C with the high potentials on outputs $G_1$ and $F'_1$ then causes the G2 flip-flop to be triggered into a true state, as indicated by equation $G_2=G_1F'_1C$. This $G_2$ output is routed back into the false inputs of the G2 and G1 flip-flops, as indicated by equations ${}_0g_2=G_2C$ and ${}_0g_1=G_2C$, respectively; and consequently, the G2 flip-flop only remains true for a single clock period, as shown by the $G_2$ waveform in Fig. 14. As noted in Fig. 13, the R1 flip-flop is triggered into a true state as a result of the G2 flip-flop being true ($r_1=G_2C$), and remains true for the duration of the computation, i.e., until triggered false by the circuit described by equation ${}_0r_1=E'_1E'_2E'_3E'_4F_1C$.

During the clock period that the $G_2$ output is high in potential, the "invert" equations of the A flip-flops (Fig. 5) become effective, causing the one's complement of the binary number to be set up in the A register at the end of the clock period. Simultaneously, the B register (Fig. 6) has its B7 flip-flop triggered true by equation $b_7=G_2C$ so as to set up the initial odd number 01 therein, and the E register (Fig. 10) has its E1 flip-flop triggered true by equation $e_1=G_2C$, causing output $E_1$ to be high in potential.

Figure 12:
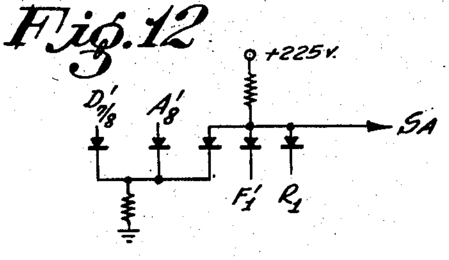
Fig. 12 shows the network for generating the "add" proposition $S_A$.

The F1 counter flip-flop is assumed to be operating continually; and, as a result, the "add" proposition $S_A$ shown in Fig. 12 is made effective when $F'_1$ is true, since output $A'_8$ was swung to a high potential as a result of the inversion of the A register flip-flops (Fig. 1). It should be understood that the logical sum $(D_{7/8}+A'_8)$ appearing in the $S_A$ proposition defines a condition which indicates, when true, that a "no carry" appears at the output of the last stage as a result of the addition of the contents of the B register into the A register. The state of the B8 flip-flop need not be considered in this $S_A$ equation since the $2^7$ stage of the B register always contains a zero, except during a single clock period when it records the first digit "one" of the square root.

Figure 14:
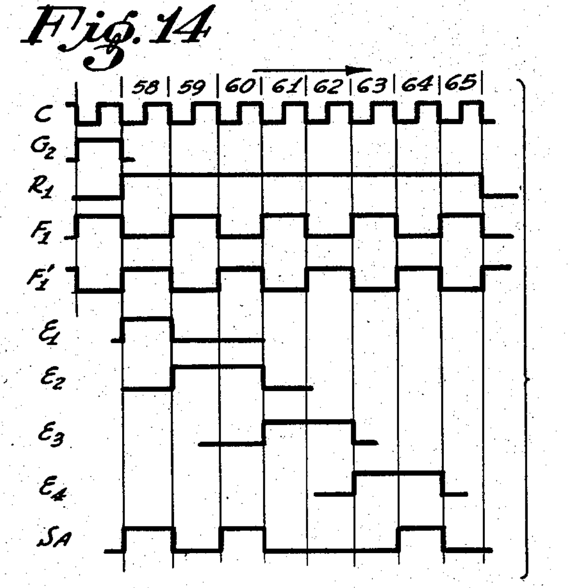
Fig. 14 shows a time diagram of the waveforms of certain terms of the system used for explaining the generation of a problem on the computer.

Since $S_A$ is true during the clock period designated 58 in the time chart of Fig. 14, the addition is carried out in the accumulator circuits; that is, the $S_A$ term causes the "add" equations of the A register, shown in Fig. 5, to be effective such that at the end of clock period 58 the A flip-flops contain the sum.

Simultaneously, during clock period 58, since output $E_1$ is true, the B8 flip-flop of the B register is set into a true state at the end of clock period 58 in accordance with the equation $b_8=S_AE_1C$; and the B6 and B7 flip-flops are rendered into true and false states respectively, as indicated by equations $b_6=F'_1E_1C$ and ${}_0b_7=F'_1E_1C$.

Simultaneously, one other action takes place at the end of clock period 58. Since the $F'_1$ output is high, the shift equations of the E register (Fig. 10) become effective, causing the E2 flip-flop to be set true and the E1 flip-flop to be set false.

During the next clock period, designated 59 in the time chart, the $F_1$ output is high, thus causing the shift equations of the B register to become effective. Accordingly, the contents of the B register flip-flops is shifted one digital position to the right at the end of clock period 59.

During clock period 60, the $F'_1$ output is again high causing output $S_A$ to be true and consequently the contents of the B register is added at the end of clock period 60 into the A register. Further, since $E_2$ is now true, a digit 1 is set up in the B6 flip-flop at the end of clock period 60 as indicated by equation $b_6=S_AE_2C$; and the digits 0 and 1 are set up in the B5 and B4 flip-flops, respectively, as indicated by equations $_0b_5=F'_1E_2C$ and $b_4=F'_1E_2C$.

During the clock period 61, the $F_1$ output is high and the contents of the B register is again shifted one digital position to the right.

During clock period 62, since the $E_3$ output is now high, the state into which the B4 flip-flop is triggered at the end of this clock period is governed by equation $$b_4=S_AE_3C$$

However, as previously noted in Fig. 1, the $S_A$ proposition is false for this cycle since a carry is generated at the output of the A register. Thus the B4 flip-flop is left in a false state. The B2 and B3 flip-flops have a 1 and 0, respectively, set up therein at the end of clock period, however, by the action of equations $b_2=F'_1E_3C$ and $_0b_3=F'_1E_3C$.

During clock period 63, the $F_1$ output being high, the contents of the B register is again shifted one digital position to the right.

Finally, during clock period 64, the $S_A$ proposition is again made true causing the B register contents to be added to the A register, and a digit 1 is accordingly set up in the B2 flip-flop at the end of this clock period by equation $b_2=S_AE_4C$. This corresponds to adding the digit 1 to the contents of the keyboard as described in connection with Example I of Fig. 1. During the next clock period 65, while $F_1$ is high, the contents of the B register is shifted to the right one digital position. It should be noted that this shifting corresponds to the dividing of the number on the keyboard by 2, as described in Example I of Fig. 1.

At the end of clock period 65, the R1 flip-flop is triggered into a false state as a result of the product $E'_1E'_2E'_3E'_4F_1$, which feeds into the false input of the R1 flip-flop, being at a high potential. The answer, representing the square root, is now found in the first four flip-flops B1 to B4, inclusive, of the B register. It should be understood that, since the R1 flip-flop is now in a false state, the "shift" equations for the first four flip-flops of the B register are inhibited from operating.

While the circuits as shown and described herein are admirably adapted to fulfill the objects and features of advantage previously enumerated as desirable, it is to be understood that the invention is not to be limited to the specific features shown but that the means and construction herein disclosed are susceptible of modification in form, proportion, and arrangement of parts without departing from the principle involved or sacrificing any of its advantages, and the invention is therefore claimed in embodiments of various forms all coming within the scope of the claims which follow.

What is claimed is:

1. A computer circuit for generation of the square root of a binary number, comprising: a first register for storing the complement of said number and sums including said complement; a second register for entry of binary numbers to be added to respective binary numbers registered in said first register; means for entering predetermined binary numbers in said second register; means for determining whether or not a carry would be generated for the highest denominational order of the number in said first register if the number currently in said second register were added thereto, and for generating a carry signal or a no-carry signal in accordance with said determination, said means being capable of effecting such addition; means responsive to a generated carry signal to inhibit said second named means for effecting an addition which would result in generation of a carry signal; and means effective following each entry of a binary number in said second register, to shift the entered number one binary place toward the least significant position of said second register.

2. An electronic calculating circuit for extracting the square root of a binary number comprising a first binary register having a plurality of flip-flop circuit stages initially set up to contain the complement of said number; a second binary register having a plurality of flip-flop circuit stages initially set up to contain the digit 1 in its second most significant binary place; a carry network responsive to the flip-flop circuits of said first and second registers to propagate and set up carry signals from the first to last binary places of said first register; means responsive to said carry signals for adding the contents of said second register to said first register if no carry-out is generated by said carry network; means for successively inserting the root digits 0 or 1 in alternate binary stages of said second register in accordance with whether a carry-out or no carry-out is generated by said carry network; means for inserting the digits 0 and 1, respectively, in the two lower order binary stages following said root digits in said second register; and means for shifting the contents of the second register one binary place toward its least significant end following each insertion.

3. A cyclically operated electronic calculating circuit for extracting the square root of a binary number, comprising: a timing source; a binary counter responsive to said timing source for defining signals representing even and odd timing periods; a first binary register initially set up at the end of the first even timing period to contain the complement of said number; a second binary register initially set up at the end of the first even timing period to contain the digit 1 in its second most significant binary place; means for shifting the contents of said second register one binary place at the end of the remaining even timing periods; a carry network responsive to the contents of said first and second registers during the odd timing periods for propagating carry signals from the least to the most significant binary places of said register and to provide a carry-out signal in response to a produced carry signal at the most significant binary place in said first register; means responsive to said registers and said carry network for adding the contents of said second register to those of said first register incident to contemporaneous ending of an odd timing period and absence of a carry-out signal; means for inserting root digits 0 or 1 in successive alternate binary places of said second register at the ends of the odd timing periods in accordance with whether a carry-out digit signal is generated by said carry network; and means for further inserting the digits 0 and 1 in the following two lower order binary places of said second register at the end of the odd timing periods irrespective of whether a carry-out digit signal is generated by said carry network.

4. A circuit for extracting the square root of a binary number comprising a first register having a plurality of flip-flop circuits for storing the complement of said number; a second register having a plurality of flip-flop circuits; means capable of entering and adding an odd valued number in said second register to the number contents of said first register; said means including means for entering said odd valued number in said second register by inserting a digit 1 in successive alternate lower order stages of said second register each time an addition is performed and simultaneously inserting the digits 0 and 1 in the following two lower order stages of said second register irrespective of whether said addition is performed; inhibiting means responsive to said first and second registers and effective to generate a carry-out signal in response to incipient overflow of said first register and to inhibit completion of a current addition in response to generation of such carry-out signal; means for shifting the odd valued number set up in said second register one binary position toward its least significant end prior to the next addition; and means for repeating said additions and shifts a number of times determined by the pairs of binary places in said registers, whereby the binary square root is set up in said second register.

5. An electronic calculating circuit for extracting the square root of a binary number comprising: a first binary register having a plurality of flip-flop circuit stages for storing the complement of said number; a second binary register having a plurality of flip-flop stages; a carry network responsive to the flip-flop circuits of said first and second registers to propagate carry signals from the first to last binary places of said first register; a first diode network responsive to said carry signals and operable to trigger the flip-flop circuits of the first register so as to add thereto the binary number in the second register only if no carry signal is generated from the last stage of said carry network; a second diode network operable to trigger the flip-flop circuits of the second register, said second diode network operable to trigger successive alternate flip-flop circuits of the first register to a "one" state if no output carry signal is generated from the last stage of said carry network, and operable to trigger the following two flip-flop circuits of the first register to a "zero" and "one" state, respectively, irrespective of whether said output carry signal is generated; and a third diode network responsive to the flip-flop circuits of the second register for shifting the number setup therein by said second diode network one binary place toward its least significant stage.

6. A circuit for extracting the square root of a binary number, including: a first register having a plurality of flip-flop circuits for initially storing the complement of said binary number and for storage of binary sum numbers; a second register having a plurality of flip-flop circuits for containing a binary number to be added to a number in said first register; means for setting up binary numbers in said second register by triggering its flip-flop circuits at predetermined times; means capable of adding the contents of said second register with those of said first register; means for determining before an addition is made whether a carry-out will result at the most significant digit position of said first register, and for generating a carry-out signal if a carry would result from the addition, and for causing such addition, only if said determining means does not generate a carry-out signal; and means for regulating the setting up of binary numbers in said second register by controlling the setting thereof in accordance with whether said addition is carried out.

7. An electronic circuit for extracting the square root of a binary number, comprising: a first register for storing the complement of said number and successive sum numbers produced by additions of other numbers to said complement; a second register; means for entering successive odd numbers into said second register, said means including networks capable of response to the contents of said first and second registers for determining presence or absence of an incipient overflow carry incident to an impending addition of the contents of the two registers and producing a characteristic signal indicative of incipient carry-out, and for normally successively adding a number set up in said second register to the contents of said first register unless inhibited by production of a signal indicative of incipient carry-out, and said means including means responsive to such signal to inhibit such addition; means for successively altering the number set up in said second register by inserting a digit 1 in successive alternate lower order stages of said second register each time an addition is performed and inserting the digits 0 and 1 in the following two lower order stages of said second register irrespective of whether said addition is performed; and means for shifting the number set up in said second register one binary position toward its least significant end prior to said adding means being again rendered operable.

8. An electronic cyclical calculating circuit comprising: a first register for containing the complement of a binary number whose square root is to be extracted and sums formed by adding other binary numbers to said complement; a second register; a third register operable as a cycle counter; a first circuit means selectively operable in accordance with the contents of said third register to enter binary members in said second register; a second circuit means responsive to the number contents of said first and second registers to generate carry signals for each denominational order of said numbers incident to and following each entry of a binary number in said second register, said carry signals including a carry-out signal for the highest denominational order of digits in said complement when an incipient addition would produce a carry thereat; a third circuit means operable in response to a generated carry-out signal to inhibit addition of the binary number entered in said second register to the binary number currently contained in said first register and responsive to absence of a carry-out signal to add the binary number contents of said first and second registers; means included in said first circuit means responsive to a carry-out signal generated by said second circuit means for controlling the operation of a portion of said first circuit means; and means for shifting the contents in said second and third registers prior to said third circuit means being again rendered operable.

9. An electronic circuit for extracting the square root of a binary number, comprising: a first register having a plurality of flip-flop circuit stages for storing the complement of said number and sums formed by additions of other numbers to said complement; a second register having a plurality of flip-flop circuit stages for storing odd valued numbers; parallel adding means capable of operating in response to the flip-flop circuit stages of both said registers to add the number in said second register to the number stored in said first register; means responsive to said first and second registers to detect an incipient carry-over from the highest digital order in said registers incident to a projected addition of the number currently in said second register to that currently in said first register, and for producing a carry-out signal indicative of an incipient carry-over, and a no-carry signal indicative of absence of an incipient carry-over; means for effectively adding a binary 1 to the lowest order digit of the number in said second register only in response to a said no-carry signal and effectively subtracting a binary 1 therefrom in response to generation of a said carry-out signal; means for setting up a binary 1 in the flip-flop circuit corresponding to the stage of said second register following the stage containing the lowest order digit of the number; and means for shifting the number so set up in said second register one binary position toward its least significant end prior to said parallel adding means being again rendered operable.

References Cited in the file of this patent

UNITED STATES PATENTS

| | | |
|---|---|---|
| 2,318,591 | Couffignal | May 11, 1943 |
| 2,751,149 | Young et al. | June 19, 1956 |

FOREIGN PATENTS

| | | |
|---|---|---|
| 410,129 | Great Britain | May 9, 1934 |
| 997,473 | France | Sept. 12, 1951 |
| 827,125 | Germany | Jan. 24, 1952 |

OTHER REFERENCES

"First Draft of a Report on the EDVAC," by John Von Neumann, Moore School of Electrical Engineering, University of Pennsylvania, June 30, 1945, pages 35–38, 43–45.

A Functional Description of the EDVAC, vol. II, Moore School of Electrical Engineering, University of Pennsylvania, Nov. 1, 1949, pages A4–1 to A4–15.

UNITED STATES PATENT OFFICE

Certificate of Correction

Patent No. 2,888,200 May 26, 1959

Eric Weiss

It is hereby certified that error appears in the above numbered patent requiring correction and that the said Letters Patent should read as corrected below.

In the grant, lines 2 and 3, and line 12, and in the heading to the printed specification, line 4, name of assignee, for "National Cash Register Company" read —The National Cash Register Company—; column 4, line 75, after "Whenever" strike out the comma; column 7, line 11, for "where $(B'_2D_{\frac{1}{2}}$" read —where $(B'_2D_{1/2}$—; line 60, for "signal" read —signals—; column 10, line 13, for "$G_2=G_1F'_1C$" read —$g_2=G_1F_1'C$—; line 23, for "${}_0r_1=E'_1E'_2E'_3E'_4F_1C$" read —${}_0r_1=E_1'E_2'E_3'E_4'F_1C$—; column 12, line 60, for "register;" read —register,—; column 13, line 42, after "addition", second occurrence, strike out the comma; column 14, line 6, for "members" read —numbers—.

Signed and sealed this 17th day of November 1959.

[SEAL]

Attest:

KARL H. AXLINE,
*Attesting Officer.*

ROBERT C. WATSON,
*Commissioner of Patents.*